(12) United States Patent
Brand

(10) Patent No.: US 10,957,363 B1
(45) Date of Patent: Mar. 23, 2021

(54) DISK DRIVE WITH OXYGEN DIFFUSION UNIT

(71) Applicant: Seagate Technology LLC, Cupertino, CA (US)

(72) Inventor: John L. Brand, Wauconda, IL (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/828,016

(22) Filed: Mar. 24, 2020

(51) Int. Cl.
*G11B 33/14* (2006.01)

(52) U.S. Cl.
CPC ...... *G11B 33/1486* (2013.01); *G11B 33/1453* (2013.01)

(58) Field of Classification Search
None
See application file for complete search history.

(56) References Cited

U.S. PATENT DOCUMENTS

| 5,910,238 | A | 6/1999 | Cable et al. |
| 8,481,077 | B2 | 7/2013 | Kheir et al. |
| 8,663,429 | B2 | 3/2014 | Lipinska-Kalita et al. |
| 10,734,035 | B1 * | 8/2020 | Sun et al. .......... G11B 33/1453 |

FOREIGN PATENT DOCUMENTS

WO 2017/039435 3/2017

OTHER PUBLICATIONS

Campbell et al., "Preparation and Properties of Hollow Glass Microspheres for Use in Laser Fusion Experiments", Nov. 1, 1983, 64 pages.

\* cited by examiner

*Primary Examiner* — Craig A. Renner
(74) *Attorney, Agent, or Firm* — Mueting Raasch Group

(57) ABSTRACT

A disk drive, has a housing structure enclosing a disk and at least one recording head. The drive includes a plurality of capsules each comprising oxygen gas enclosed within a membrane. An oxygen diffusion rate of the membrane is selected to release oxygen into the housing structure at a rate that compensates for oxygen depletion within the housing structure.

20 Claims, 4 Drawing Sheets

DISK DRIVE WITH OXYGEN DIFFUSION UNIT

SUMMARY

The present disclosure is directed to a disk drive with an oxygen diffusion unit. In one embodiment, a disk drive, has a housing structure enclosing a disk and at least one heat-assisted recording head. The drive includes a plurality of capsules each comprising oxygen gas enclosed within a membrane. An oxygen diffusion rate of the membrane is selected to release oxygen into the housing structure at a rate that compensates for oxygen depletion within the housing structure.

In another embodiment, a disk drive has a housing structure enclosing a disk, at least one recording head, and an environmental control module. The drive includes a plurality of capsules each comprising oxygen gas enclosed within a membrane. An oxygen diffusion rate of the membrane is selected to release oxygen into the housing structure at a rate that compensates for oxygen depletion caused by the environmental control module within the housing structure. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to hard disk drives. One example of a disk drive is a drive that uses heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and illuminates the near-field transducer. In response to the illumination, the near-field transducer generates surface plasmons that are directed (via the shape of the transducer) out of the recording head to create the hotspot on the recording medium. The embodiments described below may be applicable to other assisted magnetic recording technologies, such as microwave assisted magnetic recording (MAMR).

One challenge in developing in HAMR products involves degradation of the read/write head at the head-to-media interface. The NFT and surrounding elements can reach high temperatures due to a high concentration of optical energy in a small volume. The optical components at the media-facing surface of the head (often referred to as an air-bearing surface or ABS) can be susceptible to voiding or separation due to these temperatures, which can degrade performance. Further it has been found that carbon from the disk can build up on the head near the NFT, further compromising performance.

It has been also found that depletion of oxygen from air within the hard drive enclosure can accelerate or exacerbated carbon buildup at the ABS. Hard drives typically include an environmental control module to manage the composition of the gases enclosed within the drive. The environmental control module may include filters to prevent particulates from entering the enclosure, as well as desiccants, adsorptive materials, etc., for removal of water vapor, hydrocarbons, reactive compounds (e.g. ammonia), and other gases from the air circulating within the drive enclosure. The environment control unit can cause oxygen depletion within the drive enclosure.

In the example embodiments described herein, a hard disk drive enclosure includes small capsules that enclose oxygen gas ($O_2$) within a membrane. An oxygen diffusion rate of the membrane is selected to release oxygen into the housing structure at a rate that compensates for oxygen depletion within the housing structure from the environmental control module. This can be used for heat-assisted recording magnetic drives, and/or any disk drive or similar device for which oxygen depletion is a problem.

Figure 1:
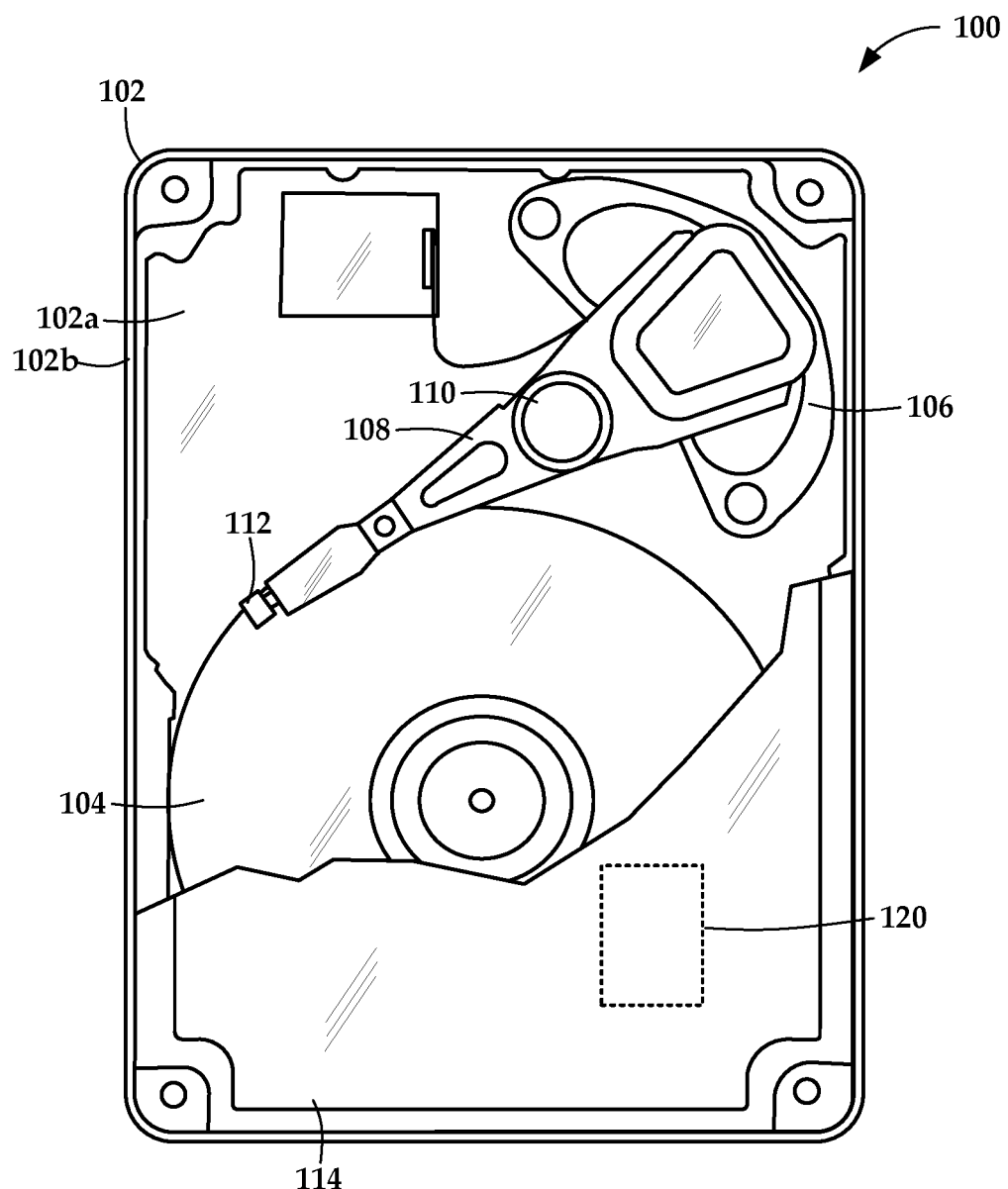
FIG. 1 is a plan view of a disk drive according to an example embodiment.

In reference now to FIG. 1, a plan view shows a hard disk drive 100 according to an example embodiment. The hard disk drive 100 may be a magnetic data storage device, e.g., HAMR hard disk drive. The drive 100 includes a cast or machined metal base 102 with a deck 102a and sidewalls 102b. One or more magnetic disks 104 are driven by a spindle motor (not shown). A voice coil motor 106 drives one or more arms 108 that rotate about a pivot 110. At the end of each arm 108 is a read/write head 112, also referred to as a slider. The read/write heads 112 write data to the disks 104 and read data back from the disks 104. The rotation of the arms 108 places the heads 112 over the target tracks on the disks 104. A removable cover 114 seals all of the components inside of the drive 100.

Figure 2:
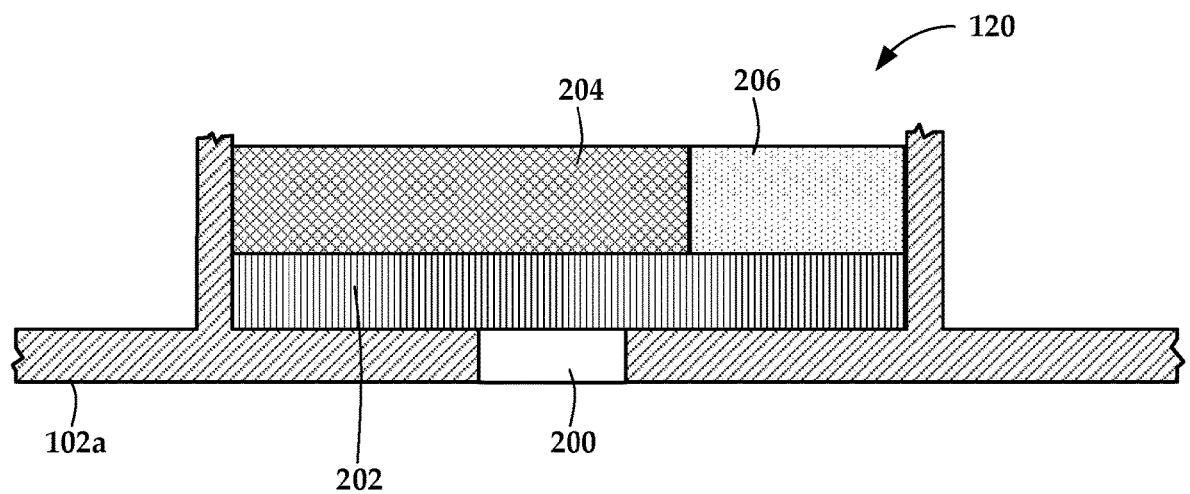
FIG. 2 is a cross-sectional view of an environmental control unit according to an example embodiment.

In order to prevent particles entering the enclosure as well as reduce the buildup of unwanted gases, the disk drive 100 includes an environmental control module 120. This module 120 is shown in greater detail in the cross-sectional view of FIG. 2. The base deck 102a includes an orifice 200 that allows air to enter and exit the enclosure of the drive 100 to maintain pressure equalization between the inside and outside of the drive 100. A filter 202 blocks particles from entering the drive enclosure. Near the filter 202 is a gas collection unit 204, which may absorb, adsorb, or otherwise collect unwanted gases, such as water vapor. Shown near the gas collection unit 204 is an oxygen diffusion unit 206 that replenishes oxygen into the drive enclosure.

The environmental control module 120 consumes oxygen in a low humidity environment. Reduced oxygen concentration within the drive enclosure has been found to increase certain near-field transducer failure modes, e.g., carbon contamination of the near-field transducer near the media-facing surface. The oxygen diffusion unit 206 includes a plurality of capsules each comprising oxygen gas enclosed within a membrane. An oxygen diffusion rate of the membrane is selected to release oxygen into the housing structure (e.g., base 102 and cover 114) at a rate that compensates for oxygen depletion within the housing structure from the environmental control module 120.

Note that the oxygen diffusion unit 206 need not be co-located with or in the environmental control module 120. In some embodiments, the oxygen diffusion unit 206 could be located elsewhere within the drive enclosure. For example, the oxygen diffusion unit 206 could be located proximate a diffuser filter that cleans air that is circulated by the spinning disks.

Figure 3:
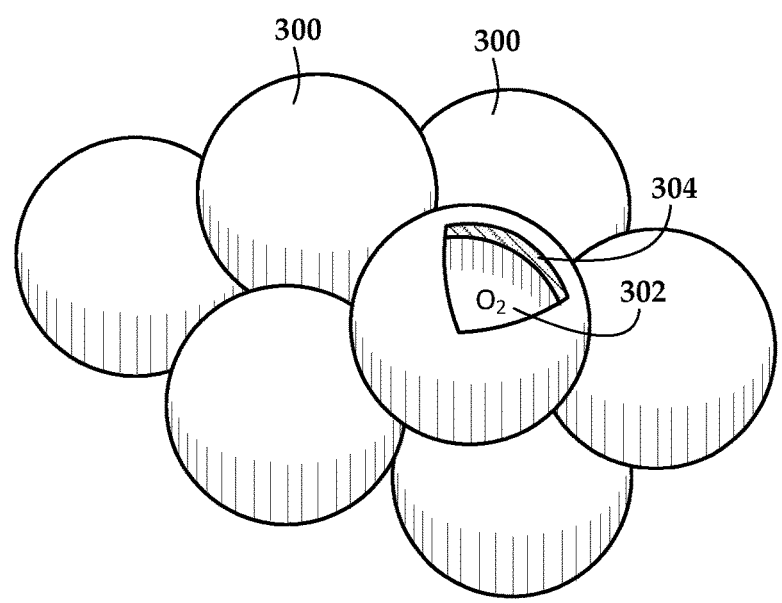
FIG. 3 is a perspective view of microsphere capsules according to an example embodiment.

In FIG. 3, a perspective view shows microspheres 300 that may be used as oxygen diffusion capsules according to an example embodiment. The microspheres 300 are filled with pressured oxygen 302 to supply a continuous flow of oxygen within the drive enclosure based on the diffusion through the microsphere walls 304. The oxygen 302 diffuses out of the walls 304 of the microspheres 300 at a predictable rate. Note that other shapes besides spheres may be used in forming the capsules. For example, the capsules may be formed of other shapes, such as ovoids, ellipsoids, random shapes, spherocylinders, etc. Also, different shapes may be combined together into the same oxygen diffusion unit. The dimensions of glass capsules may be 1-10 microns in diameter with a wall thickness of 0.05-0.2 microns. For polymers, the diameter may be from 3-50 microns, with 0.5-2 micron wall thickness.

The capsules as described herein may be formed of a number of different materials such as glasses, polymers, ceramics, and metals. For example, the walls/membranes 304 may be formed of silica glass, silica-free glass, aluminum oxides, titanium oxides, soda lime borosilicate glass, alkali-alumino silicate, polystyrene, polycarbonate, polypropylene, polyacrylate, and polyurethane. The capsules can be filled with oxygen during the manufacturing process or by pressurized diffusion after manufacturing. The oxygen in the capsules will diffuse out based upon the material and wall thickness. The microsphere materials and thicknesses and microsphere quantity are selected in order to provide the desired oxygen volume. The capsules may include other gases together with oxygen, such as helium.

The diffusion-supplied oxygen from the capsules replenishes the oxygen within the drive enclosure, the oxygen having been consumed over time by the materials in the environmental control unit. By way of example, assume the oxygen consumption rate is 0.1 mbar/day. The total gas volume in the drive is around 50 cubic centimeters for purposes of this example. That means the total 5-year consumption is 9000 mbar cc (0.1*365*5*50). If the capsule internal volume is ⅔ the volume of the pile of capsules, then 3 cubic centimeters of microspheres filled to 5 atmospheres (1000 mbar) provides the needed oxygen. That is 3 cc×5000 mbar×⅔ for 10,000 mbar cc.

Figure 4:
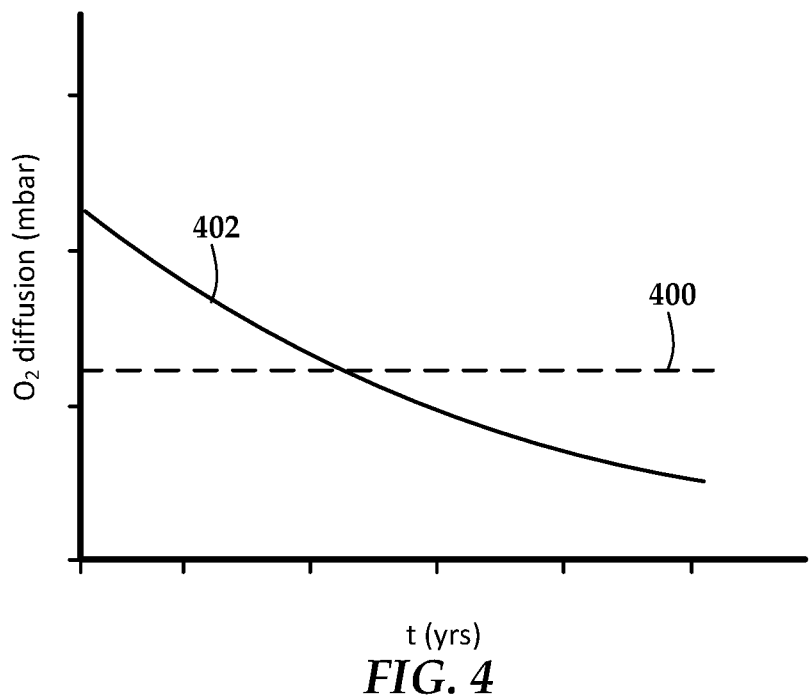
FIG. 4 is a graphs showing oxygen diffusion in a device according to an example embodiment.

Note that the diffusion rate of the oxygen from a diffusion capsule will generally not be constant over time. In FIG. 4, a graph shows a simplified representation of diffusion rate according to an example embodiment. For purposes of design, a constant rate of oxygen consumption may be assumed, as indicated by line 400. However, oxygen may be released through the capsule walls at an asymptotic rate, as shown by curve 402. Therefore, capsule parameters (e.g., wall thickness, wall material) may be selected so that the average of the diffusion curve over the expected lifetime of the drive (e.g., more than two years, up to five years or more) is equal to the constant value 400. Note that the rate of consumption of oxygen in the drive may also be asymptotic similar to curve 402, such that the capsules can be tailored to closely match the consumption of oxygen over time, at least under some assumed environmental conditions.

The oxygen diffusion capsules described herein may be packaged in a number of ways before being assembled into a disk drive unit. For example, loose capsules (e.g., beads, microspheres) may be enclosed in an air-permeable structure (e.g., a cage) that physically restrains the capsules from movement while allowing airflow around the capsules. In other embodiments, the capsules may be suspended in a porous matrix.

Figure 5:
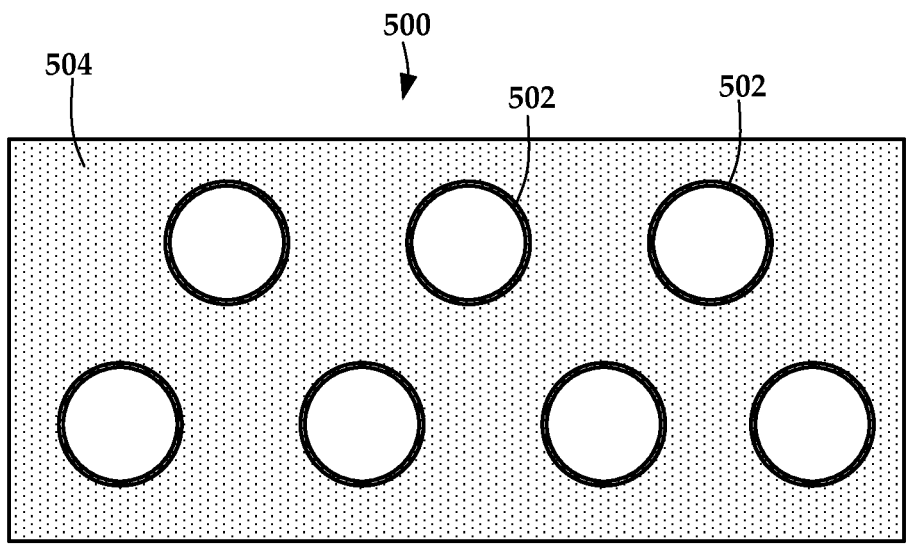
FIG. 5 is a cross-sectional view of a capsule support structure according to an example embodiment.

In FIG. 5, a cross-sectional view shows an oxygen diffusion unit 500 according to an example embodiment. This oxygen diffusion unit 500 includes microspheres 502 encased in a carrier material 504. Generally, the carrier material 504 is air permeable such that oxygen from the microspheres 502 can diffuse outside of the unit 500. The carrier material 504 may include an artificial or natural fiber, a matrix of solid material (e.g., polymer, glass, metal), a solidified gel or foam, etc. Use of a carrier material 504 may help prevent loose microspheres 502 from escaping their enclosure and causing damage to mechanical drive components.

As noted above, the oxygen consumption within the hard drive may increase under low humidity condition, the lessening the need for the oxygen diffusion unit 500 to release oxygen. In some embodiments, the carrier material 504 can be selected such that it decreases permeability in response to higher levels of humidity. This can slow the release of oxygen from the capsules 502 under higher humidity conditions and increase the release of oxygen under lower humidity conditions. Such partial control the oxygen diffusion in the presence of humidity may be possible with polymers where the water vapor adheres to polymer's surface. Polyurethane, polyacrylate and polycarbonate are possible candidates.

Figure 6:
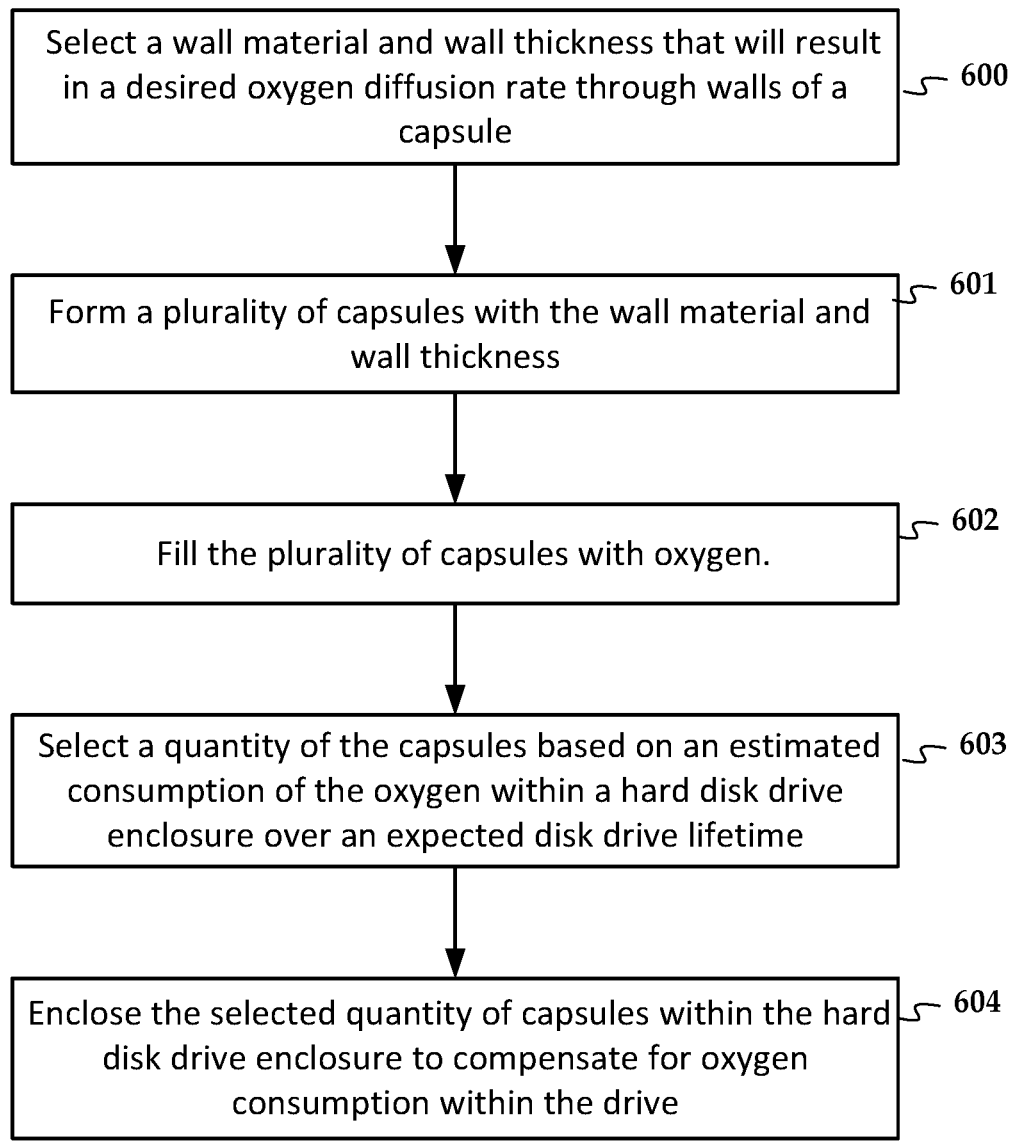
FIG. 6 is a flowchart of a method according to an example embodiment.

In FIG. 6, a flowchart illustrates a method according to an example embodiment. The method involves selecting at step 600 a wall material and wall thickness that will result in a desired rate of diffusion of oxygen through walls of a capsule. A plurality of capsules are formed at step 601 with the wall material and wall thickness and filled at step 602 with oxygen. A quantity of capsules is selected at step 603 based on an estimated consumption of oxygen within a hard disk drive enclosure over an expected disk drive lifetime. This selection at step of the quantity may consider, among other things, the oxygen diffusion rate selected at step 600, the air volume of the disk drive, the expected environmental conditions, space available within the drive, etc. The selected quantity of capsules are enclosed at step 604 within the hard disk drive to compensate for oxygen consumption, e.g., of an environmental control unit enclosed within the drive.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A disk drive, comprising:
   a housing structure enclosing a disk and at least one heat-assisted recording head; and
   a plurality of capsules each comprising oxygen gas enclosed within a membrane, wherein an oxygen diffusion rate of the membrane is selected to release oxygen into the housing structure at a rate that compensates for oxygen depletion within the housing structure.

2. The disk drive of claim 1, further comprising an environmental control module, wherein the oxygen depletion is caused by the environmental control module.

3. The disk drive of claim 1, wherein the plurality of capsules comprise microspheres.

4. The disk drive of claim 1, wherein the oxygen diffusion rate is selected to release the oxygen over two or more years.

5. The disk drive of claim 1, wherein the membrane comprises at least one of glass and ceramic.

6. The disk drive of claim 1, wherein the plurality of capsules are co-located with an environmental control module.

7. The disk drive of claim 1, wherein the compensation for oxygen depletion prevents degradation to a near-field transducer of the heat-assisted recording head.

8. The disk drive of claim 1, wherein the capsules are between 1-50 microns in diameter, and the membranes are between 0.05-2 microns thick.

9. The disk drive of claim 1, wherein the capsules are encased in a polymer structure having a surface to which water vapor adheres.

10. The disk drive of claim 1, wherein the capsules further enclose helium within the membrane.

11. A disk drive, comprising:
    a housing structure enclosing a disk, at least one recording head, and an environmental control module; and
    a plurality of capsules each comprising oxygen gas enclosed within a membrane, wherein an oxygen diffusion rate of the membrane is selected to release oxygen into the housing structure at a rate that compensates for oxygen depletion caused by the environmental control module within the housing structure.

12. The disk drive of claim 11, wherein the plurality of capsules comprise microspheres.

13. The disk drive of claim 11, wherein the oxygen diffusion rate is selected to release the oxygen over two or more years.

14. The disk drive of claim 11, wherein the membrane comprises at least one of glass and ceramic.

15. The disk drive of claim 11, wherein the plurality of capsules are co-located with the environmental control module.

16. The disk drive of claim 11, wherein the recording head comprises a heat-assisted recording head, the compensation for oxygen depletion preventing degradation to a near-field transducer of the heat-assisted recording head.

17. The disk drive of claim 11, wherein the capsules are between 1-50 microns in diameter, and the membranes are between 0.05-2 micron thick.

18. A method, comprising:
    selecting a wall material and wall thickness that will result in a desired rate of diffusion of oxygen through walls of a capsule;
    forming a plurality of capsules having the wall material and wall thickness;
    filling the plurality of the capsules with oxygen;
    selecting a quantity of the capsules based on an estimated consumption of oxygen within a hard disk drive enclosure over an expected disk drive lifetime; and
    enclosing the selected quantity of capsules within the hard disk drive enclosure to compensate for oxygen consumption.

19. The method of claim 18, wherein the selected quantity of capsules compensates for oxygen consumption by an environmental control unit enclosed within the drive.

20. The method of claim 18, wherein the expected disk drive lifetime is greater than two years.

* * * * *